UNITED STATES PATENT OFFICE.

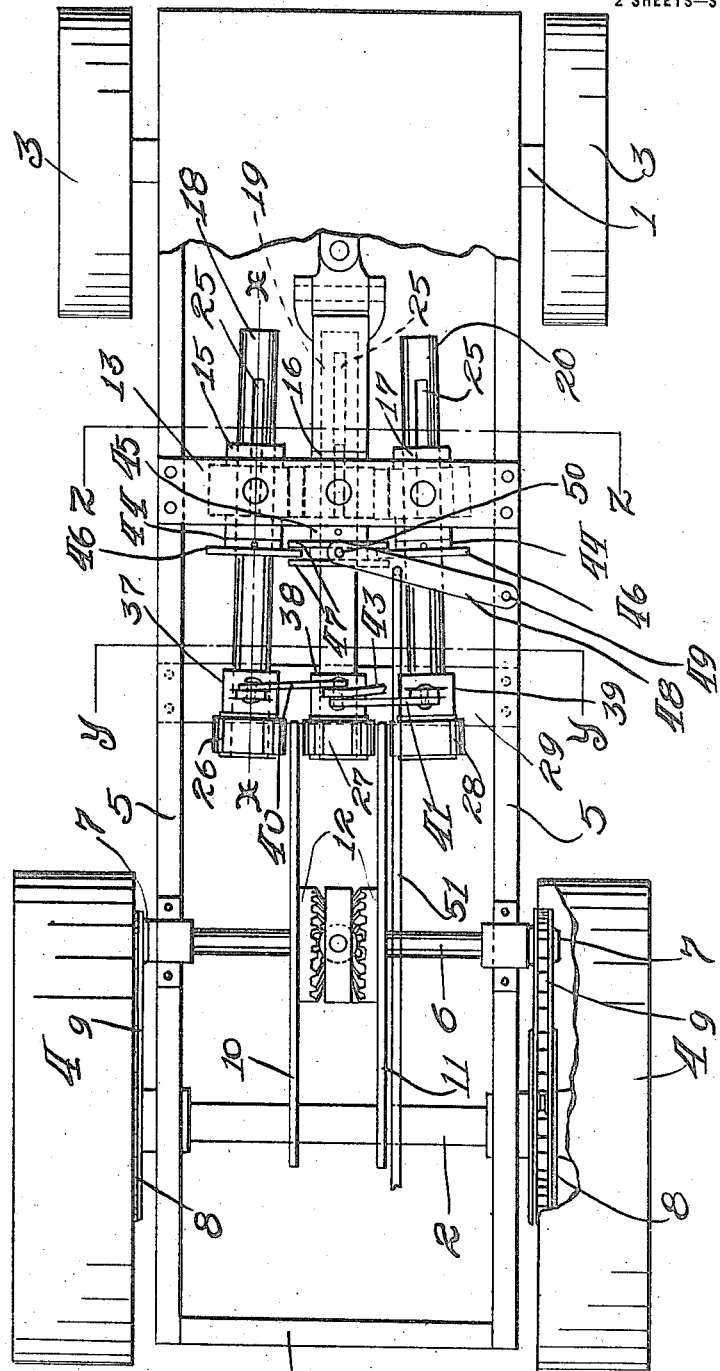

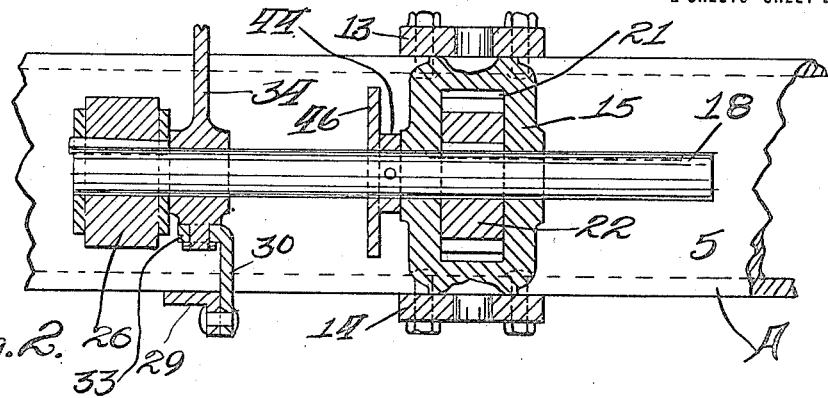
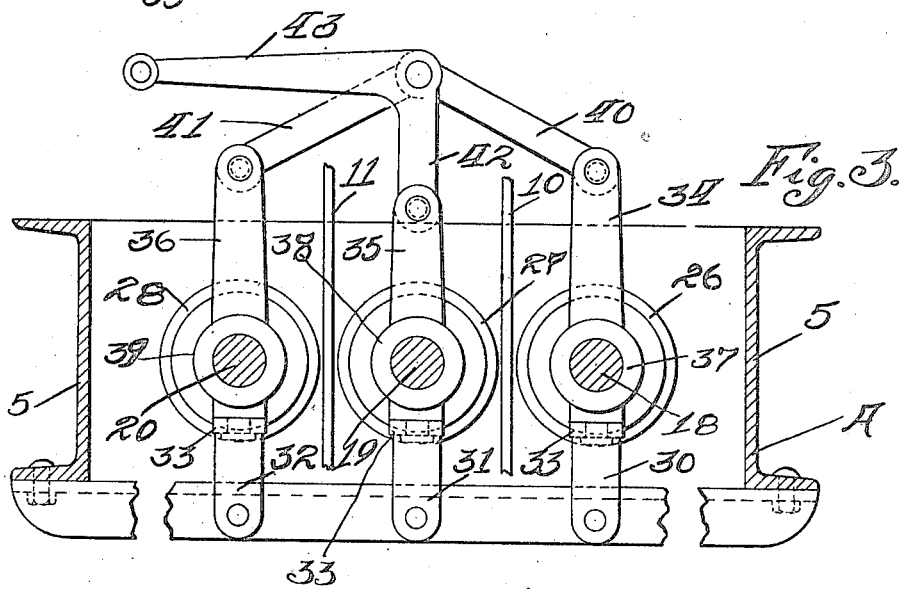
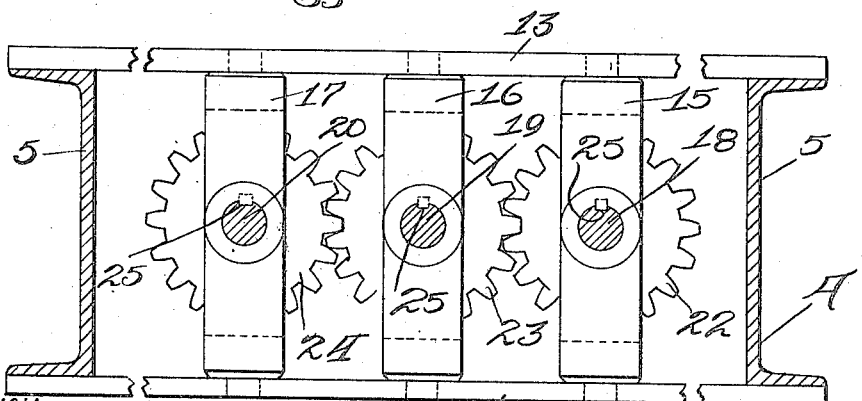

REUBEN B. OMAN, OF WILLMAR, MINNESOTA.

TRANSMISSION MECHANISM.

1,248,387.  Specification of Letters Patent.  Patented Nov. 27, 1917.

Application filed October 22, 1914. Serial No. 868,016.

*To all whom it may concern:*

Be it known that I, REUBEN B. OMAN, a citizen of the United States, residing at Willmar, in the county of Kandiyohi, and State of Minnesota, have invented a new and useful Improvement in Transmission Mechanism, of which the following is a specification.

This invention relates to certain new and useful improvements in variable speed driving mechanism for motor vehicles of the friction drive type, and more particularly to the mounting of the driving mechanism, it being an object to provide a practical device of this character whereby double frictional contact heretofore obtained is accomplished, and at the same time a perfect mesh of the driving gears assured, so as to avoid any cramping or binding thereof and thus increase the longevity of life of such gears.

Another object of the invention is to provide a device of this character by means of which either the transmission or the reversing disk may be engaged by driving rollers simultaneously on both sides, whereby increased frictional contact is obtained in such manner as to avoid lateral stress or torque on the disk.

A further object of the invention is the provision of simple and efficient means for varying the speed of the driven elements.

Other and further objects and advantages of the invention will be hereinafter set forth and the novel features thereof defined by the appended claim.

In the drawings, Figure 1 is a plan view of a device embodying my invention, partly broken away; Fig. 2 is a section on line X—X of Fig. 1; Fig. 3 is a transverse section on line Y—Y of Fig. 1; Fig. 4 is a similar section on line Z—Z of Fig. 1.

Like numerals of reference refer to like parts in the several figures of the drawings.

As shown in the drawings, the device is embodied as a part of the driving mechanism for a tractor, though it will be appreciated the same as especially adapted for use on any motor driven vehicle wherein the driving power is transmitted to one or both axles in propelling the vehicle through friction disks, and the like.

The reference character A designates the frame of a tractor of any desired type suitably mounted on front and rear axles 1 and 2, respectively, and the usual front wheels 3 and rear wheels 4.

Journaled upon the side frame members 5 of the tractor intermediate the front and rear wheels thereof, is a shaft 6, one end of which is extended beyond the frame and carries a sprocket wheel 7 coöperating with a similar wheel 8, secured upon the axle 2, through the medium of a sprocket chain 9 to communicate the drive to the axle as will later appear. Rigidly secured in spaced relation upon said shaft in any preferred manner intermediate its ends, are friction disks 10 and 11, of the desired size and material, which are substantially parallel and have hubs 12 spaced from one another adapted to coact with the differential or compensation gears (not shown) of any well known type.

Disposed across the frame of the tractor at a point between the axle 1 and shaft 6, are parallel transverse beams 13 and 14 in vertical alinement and secured, respectively, to the upper and lower faces of the channel bars forming the side frame members 5. Suitably journaled in the transverse beams 13 and 14 are spaced rotary members 15, 16, and 17, forming bearings for shafts 18, 19 and 20, said rotary members being provided with slots 21 opening transversely of the machine and within which intermeshing gears 22, 23 and 24, splined or feathered upon the shafts 18, 19 and 20, are adapted to work, as shown in Fig. 4, said shafts having elongated grooves 25 therein for a purpose which will later appear.

Rigidly secured at the inner ends of the shafts 18, 19 and 20 are driving friction rollers 26, 27 and 28, respectively, of any preferred construction, the rollers 26 and 28 being disposed adjacent the outside faces of the disks 10 and 11, respectively, and the roller 27 disposed between the two disks as shown in Figs. 1 and 3 and for a purpose hereinafter appearing.

Secured to the under faces of the side frame members 5 is a transverse beam 29 to which are rigidly attached, standards 30, 31 and 32 having angled upper ends 33, (see Fig. 2) upon which are pivotally secured arms 34, 35 and 36, enlarged as shown at 37, 38 and 39 to form bearings for the shafts 18, 19 and 20, respectively, suitable wearing washers being disposed around the shafts between said bearings and rollers if desired. The arms are extended upwardly beyond the bearings, the two outer arms 34 and 36, being pivotally connected at their free ends with links 40 and 41, respectively, while the center arm 35 is pivotally connected to one arm 42 of a bell crank or similar construction, upon either side of the apex of which is pivoted the respective free ends of links 40 and 41. The other arm 43 of the bell crank is suitably connected with an operating lever (not shown) leading to a point convenient to the driver's seat (not shown).

Keyed upon the shafts 18, 19, and 20, are collars 44 and 45, each of the collars having a cast annular flange 46, extending at right angles thereto; while the collar 45 is provided with a pair of spaced, annular angularly disposed flanges 47 cast thereon and between which the flanges 46 of collars 44 extend. A suitable link 48 is pivoted at 49 to one of the side frame members 5 and carries at its free end a pin or lug 50 riding within the track formed by the spaced flanges 47, as shown in Fig. 1. A pull rod 51 or other actuating device leading from the driver's seat, is pivotally connected with the link 48 intermediate the ends thereof.

A suitable motor, not shown, is conveniently located on the forward part of the tractor frame and is connected with the center shaft 19, and through it to the other driving parts of the mechanism, by means of any well-known universal joint, not shown in detail, but which permits of sufficient swinging of the shaft 19 through its rotary bearing member 16 to enable the driver to throw the friction rollers into contact with the desired disk without in any way affecting the perfect mesh of the gears 22, 23 and 24, and thereby prolonging the life and utility of these parts, and eliminating any undue friction.

The operation of the device is as follows:—

When it is desired to drive the vehicle in a forward direction, the proper disk 11, for example, is frictionally engaged by the driving rollers 27 and 28 by operating the appropriate lever from the driver's seat to depress the arm 43 of the bell crank which, as will be understood, throws the rollers 27 and 28 toward one another to frictionally engage the intermediate disk 11, and forces the roller 26 away from its adjacent disk 10, which is thus permitted to run idle. When it is desired to move the vehicle in a reverse direction, the arm 43 is forced in the opposite direction to bring rollers 26 and 27 into engagement with disk 10, and to force roller 28 away from disk 11. Due to the pivotal arrangement of bearings 15, 16, and 17, for driving shafts 18, 19 and 20, respectively, I am able to obtain perfect pitch of the intermeshing gears 22, 23 and 24, when either two adjacent gears are forced into frictional engagement with the intervening disk.

By means of the lever connecting with pull rod 51 attached to the link 48 having lug 50 riding in the track formed by flanges 47 of collar 45 and its connection with collars 44, the several drive shafts 18, 19 and 20 may be reciprocated in their respective bearings and intermeshing gears to move the driving friction rollers 26, 27 and 28 radially of the disks 10 and 11 to regulate the speed thereof, the bearings for the gears being fulcrumed in the transverse beams 13 and 14, at a point in alinement with the tooth face center of said gears so as to assume at all times a perfect mesh thereof.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claim.

Having described my invention what I claim as new and desire to protect by Letters Patent is:—

Apparatus of the class set forth, comprising, in combination a supporting frame, a driving shaft, a pair of driven shafts disposed on opposite sides of said driving shaft, intermeshing gears carried by said shafts, journals carried by said frame for each of said driving and driven shafts, said journals being swiveled to permit swinging movement of the ends of said shaft and permitting said shafts sliding longitudinally, friction rollers secured to adjacent ends of said driving and driven shafts, a transmission shaft journaled upon said frame, a pair of spaced disks carried by said transmission shaft and interposed between adjacent friction rollers to be engaged and revolved thereby, upwardly projecting arms pivoted by their lower ends upon said frame and in which the ends of said shafts carrying said friction rollers are journaled and slidably mounted between said friction rollers and said journals carried by said frame, and a system of levers connected with the upper ends of said arms adapted by their movement to swing said shafts with their friction rollers engaged with the sides of either one or the other of said disks.

In testimony whereof, I have signed my name to this specification in the presence of two subscribing witnesses.

REUBEN B. OMAN.

Witnesses:
A. S. SWENSON,
WM. J. JOHNSON.